Jan. 30, 1945.    G. J. MEYER ET AL    2,368,317
MOTOR BRAKE ADJUSTING MEANS
Filed Sept. 16, 1942
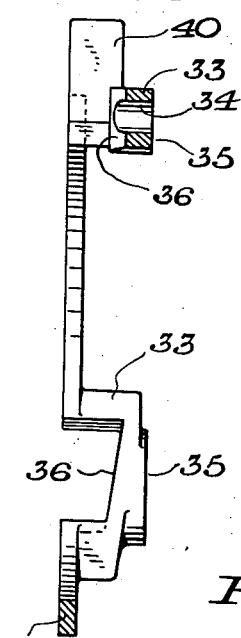
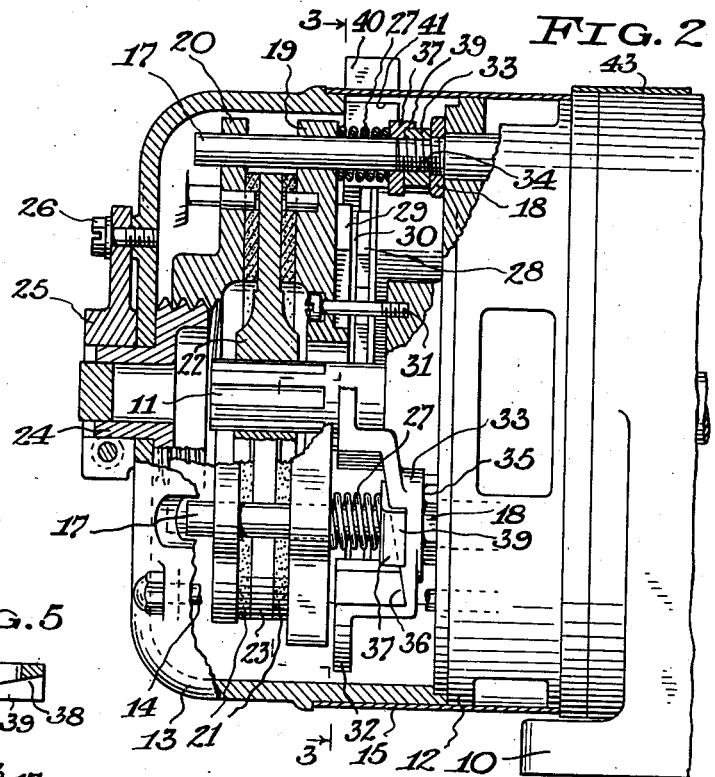
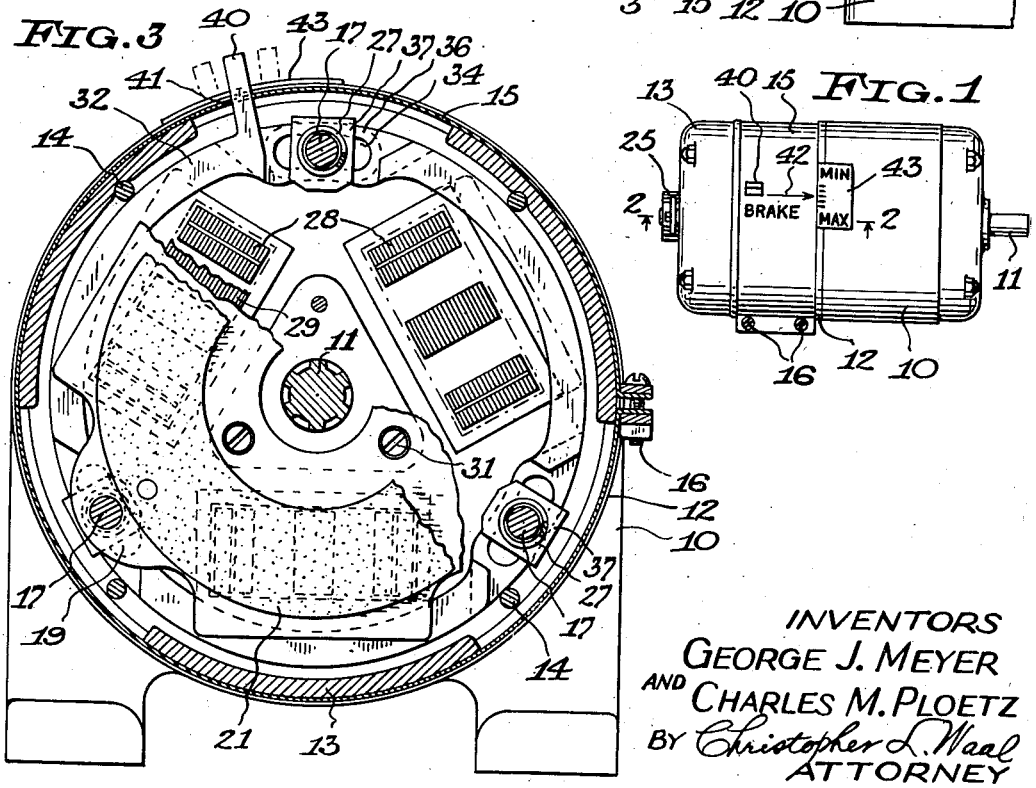
INVENTORS
GEORGE J. MEYER
AND CHARLES M. PLOETZ
BY Christopher L. Waal
ATTORNEY Patented Jan. 30, 1945

2,368,317

UNITED STATES PATENT OFFICE 2,368,317

MOTOR BRAKE ADJUSTING MEANS

George J. Meyer, Milwaukee, and Charles M. Ploetz, Greenfield, Wis.

Application September 16, 1942, Serial No. 458,500

8 Claims. (Cl. 188—171)

The present invention relates to electric motor brakes and more particularly to means for adjusting the brakes to vary the braking action.

A type of electric motor has heretofore been devised embodying an electrically released brake for bringing the motor and connected load mechanism to a stop. In one well known construction the brake is of the disk type and includes an armature-carrying pressure plate, this plate being urged axially in braking direction by a series of compressed coiled springs and being attracted against the action of the springs by electromagnets mounted on the motor, so as to release the brake.

An object of the invention is to provide improved and easily manipulated means for adjusting the spring pressure on the braking mechanism of an electric motor, so as to vary the braking effect and stopping time.

Another object of the invention is to provide brake adjusting means which is of simple, durable and inexpensive construction, and which is readily accessible from the exterior of the motor.

Still another object is to provide brake adjusting means permitting a wide variation of the spring pressure without materially changing the air gap of an electromagnetic releasing means for the brake.

A further object is to utilize a shiftable jacket member of the motor as an actuator for changing the spring pressure and as a retainer for holding the spring pressure adjustment.

A still further object is to provide brake adjusting means capable of ready application to existing motors.

The invention further consists in the several features hereinafter described and claimed.

In the accompanying drawing illustrating one specific embodiment of the invention, Fig. 1 is a top view of an electric motor provided with brake adjusting means of the invention;

Fig. 2 is a sectional elevation of the motor taken generally along the line 2—2 of Fig. 1;

Fig. 3 is a transverse sectional elevation of the motor taken generally along the line 3—3 of Fig. 2;

Fig. 4 is a detail sectional elevation of a brake-adjusting ring, and

Fig. 5 is a detail sectional view of a spring seat member adapted to cooperate with the adjusting ring.

In the drawing 10 designates an electric motor having a rotor shaft 11 which is journalled in an end frame member 12 of the motor. A cup-shaped brake housing or cover 13 forms an end extension of the motor frame and is detachably secured to the end frame member 12 as by means of bolt rods 14 extending parallel to the motor shaft. A cylindrical jacket 15 formed by a sheet metal band surrounds the adjacent portions of the motor end frame member 12 and the brake housing member 13 to cover apertured portions of these members. The adjacent ends of the jacket band are outwardly flanged and detachably secured together by clamping screws 16.

Secured to the end frame member 12 are several equally spaced guide studs 17 arranged about the motor shaft in parallel relation thereto and extending within the brake housing 13, the guide studs having clamping nuts 18 engaging the motor end frame member 12. Slidably mounted on the guide studs 17 and held thereon against rotation are a pressure plate 19 and an abutment plate 20 carrying respective stationary friction disks 21. A rotatable brake hub 22 is splined on the motor shaft 11 and carries a brake disk 23 which is interposed between the friction disks 21. As is well understood in this art a plurality of rotatable brake disks and cooperating stationary friction disks may be provided.

The abutment plate 20 is axially adjustable in any suitable manner, as by screw-threading the plate onto a rotatively adjustable head member 24 mounted in the end wall of the brake housing, the head member being coaxial with the motor shaft and being confined against axial shifting. The head member is angularly adjustable by means of an arm 25 clamped thereto, the arm being releasably secured to the brake housing 13 as by means of a screw 26.

The pressure plate 19 is urged axially in braking direction by a series of compressed coiled springs 27 surrounding the respective guide studs 17 at a region between the pressure plate and the motor end frame member 12, and is released from braking pressure by a series of electromagnets 28 carried by the motor end frame member, the pressure plate having armatures 29 to cooperate with the electromagnets. Each armature is normally separated from the pole pieces of the corresponding electromagnet by a short air gap 30. The armatures and magnet cores are here shown to be of laminated construction. In some cases, bolts 31 are secured to the motor end frame member 12 to limit the spring-urged travel of the pressure plate and to facilitate assembly of the device.

The motor brake construction thus far described is of a well known type. Braking pressure is applied by the spring-urged pressure plate 19 when the electromagnets 28 are deenergized, as upon the opening of the motor circuit, thereby bringing the motor and connected load mechanism to a stop. Upon starting the motor the electromagnets are energized, thus attracting the pressure plate and releasing the braking pressure. Wear on the brake can be taken up by axially displacing the abutment plate 20 by means of the rotatively adjustable head member 24. Axial displacement of the abutment plate has also been used to vary the spring pressure on the brake, but this adjustment is quite limited because of the small air gap at the electromagnets, and has the disadvantage of changing the length of the air gap. An increase in the air gap will reduce the pull of the electromagnets and will cause excessive heating of the coils in the case of alternating current electromagnets. For effecting any substantial change in spring pressure it has heretofore been necessary to dismantle the brake mechanism and to either substitute new springs or place washers on the guide studs for increasing the compression of the springs. In practice these expedients have been found objectionable, particularly in the case of a motor mounted in a confined space and not readily accessible.

In order the overcome these various disadvantages the brake adjusting means of the present invention has been devised. In the preferred form of the invention, a cam ring 32 is rotatably mounted in the brake housing 13 coaxially of the motor shaft and is provided with axially offset portions 33 having respective concentric arcuate slots 34 slidably receiving therethrough the respective guide studs 17. The guide studs serve to support the rotatively adjustable ring 32 and, if desired, the bolt rods 14 may also serve this purpose. In some instance the studs may be flatted to fit in the slots 34. The offset portions 33 at one side have flat coplanar surfaces 35 normal to the shaft axis and slidably bearing on the respective nuts 18, and on the other side the offset portions have cam surfaces 36. Wedge-shaped spring seat washers 37 are carried on the respective guide studs 17, each washer having a flat cam surface 38 slidably bearing on the adjacent cam surface 36 of the cam ring, and having a flange 39 at its outer end engageable with the outer edge of the cam ring to prevent relative rotation. The springs 27 are interposed between the pressure plate 19 and the washers 37, the spring seat faces of the washers extending at right angles to the guide studs, and the springs being retained in position by the guide studs. At one of the offset portions 33 the cam ring has a radial finger 40 extending through and fitting in an opening 41 formed in the rotatable jacket member 15, thus forming a coupling connection between the cam ring and jacket member. An index mark 42 on the jacket member cooperates with a calibrated index plate 43 secured to the motor frame.

By angularly shifting the cam ring 32 the pressure of the several coiled springs 27 will be simultaneously varied so as to adjust the braking effect, the pressure on all the springs being substantially equal. Rotation of the ring in one direction (clockwise as viewed in Fig. 3) will increase the spring pressure and thereby increase the braking action, and conversely, rotation in the opposite direction will reduce the spring pressure and thereby reduce the braking action. When adjustment of the cam ring is to be effected the clamping screws 16 of the jacket member 15 are loosened to permit this member to turn with the cam ring, and when the desired position of the cam ring is reached the jacket member screws are tightened to retain the adjustment. The cam ring is rotated by shifting the jacket member or, alternatively, by shifting the finger 40 on the cam ring. The finger 40 and the flanged ends of the jacket member are located at any convenient points around the periphery of the motor. The spring pressure can be adjusted through a relatively wide range, the possible axial travel of the spring-compressing washers 37 being several times as great as the length of the air gap 30 at the electromagnets. The adjustment of the spring pressure on the brake will not appreciably change this air gap.

While one specific embodiment of the invention has been disclosed, it will be obvious to those skilled in the art that modifications may be made without departing from the spirit of the invention.

What we claim as new and desire to secure by Letters Patent is:

1. The combination, with an electric motor having electrically released braking mechanism including brake-applying spring means, and a jacket member rotatively mounted on the motor and releasably clamped thereto, of rotatively shiftable means for varying the pressure on said spring means to change the braking effect, said shiftable means being coupled to said jacket member to turn therewith, and said jacket member when clamped to the motor retaining said shiftable means in rotatively adjusted position.

2. The combination, with an electric motor having electrically released braking mechanism including a plurality of brake-applying springs arranged about the motor axis, and a jacket member rotatively mounted on the motor and releasably clamped thereto, of a rotatively shiftable cam ring for varying the pressure on said springs to change the braking effect, said cam ring being coupled to said jacket member to turn therewith, and said jacket member when clamped to the motor retaining said cam ring in rotatively adjusted position.

3. The combination, with an electric motor having electrically released braking mechanism including a plurality of brake-applying springs arranged about the motor axis, and a jacket member rotatively mounted on the motor and releasably clamped thereto, of a rotatively shiftable cam ring for varying the pressure on said springs to change the braking effect, said cam ring having a projection and said jacket member having an opening to receive said projection for coupling said cam ring to said jacket member, and said jacket member when clamped to the motor retaining said cam ring in rotatively adjusted position.

4. The combination, with an electric motor having a frame member and a rotor shaft, a plurality of guide studs secured to said frame member and arranged about the rotor axis in parallel relation to said axis, electrically released braking mechanism for said shaft including a nonrotative axially movable pressure plate slidable on said studs, and compressed coiled springs on said studs for urging said pressure plate axially in braking direction and interposed between said pressure plate and frame member, of a ring member having apertured cam portions receiving said studs therethrough and interposed between said pressure plate and frame member for resisting the thrust of said springs and varying the pressure thereof, said ring member being rotatably shiftable about the rotor axis for simultaneously adjusting the pressure of said springs.

5. The combination, with an electric motor having a frame member and a rotor shaft, a plurality of guide studs secured to said frame member and arranged about the rotor axis in parallel relation to said axis, electrically released braking mechanism for said shaft including a non-rotative axially movable pressure plate slidable on said studs, and compressed coiled springs on said studs for urging said pressure plate axially in braking direction and interposed between said pressure plate and frame member, of a ring member having apertured cam portions receiving said studs therethrough and interposed between said pressure plate and frame member for resisting the thrust of said springs and varying the pressure thereof, and wedge-shaped spring seat members interposed between said cam portions and springs and slidably bearing on said cam portions, said ring member being rotatably shiftable about the rotor axis for simultaneously adjusting the pressure of said springs.

6. The combination, with a rotary member, braking mechanism for said rotary member including a non-rotative axially movable pressure member, supporting means for said pressure member including guide rods extending parallel to the axis of said rotary member, and compressed coiled springs surrounding said guide rods for urging said pressure member in braking direction, of means for adjusting the braking effect comprising a rotatively shiftable ring member having cam portions receiving said rods therethrough and acting on said springs to vary the compression of said springs.

7. Adjusting means for a rotor brake of the type having a non-rotative axially movable pressure member axially urged in braking direction by a plurality of compressed coiled springs arranged about the axis of the brake and further having guide members extending in said springs parallel to said axis, comprising a ring member rotatively shiftable about the brake axis and having peripherally spaced laterally facing cam surfaces arranged about said ring member at the axes of said springs for simultaneously varying the braking pressure of the springs when said ring member is rotatively shifted, said ring member being apertured at the cam portions thereof to receive said guide members.

8. The combination, with a rotary member, braking mechanism for said rotary member including a non-rotative axially movable pressure member, a plurality of compressed coiled springs for urging said pressure member axially in braking direction, said spring being arranged about the axis of said rotary member in parallel relation to the axis of said member, and electromagnetic releasing means for said pressure member acting in opposition to said springs and including relatively movable magnetizable members with an air gap between them, of a ring member having peripherally spaced lateral cam faces resisting the thrust on said springs and varying the pressure thereof, said ring member being rotatively shiftable about the axis of said rotary member for simultaneously adjusting the pressure of said springs, the adjustable compression of said springs by said ring member being independent of said air gap.

GEORGE J. MEYER.
CHARLES M. PLOETZ.